UNITED STATES PATENT OFFICE.

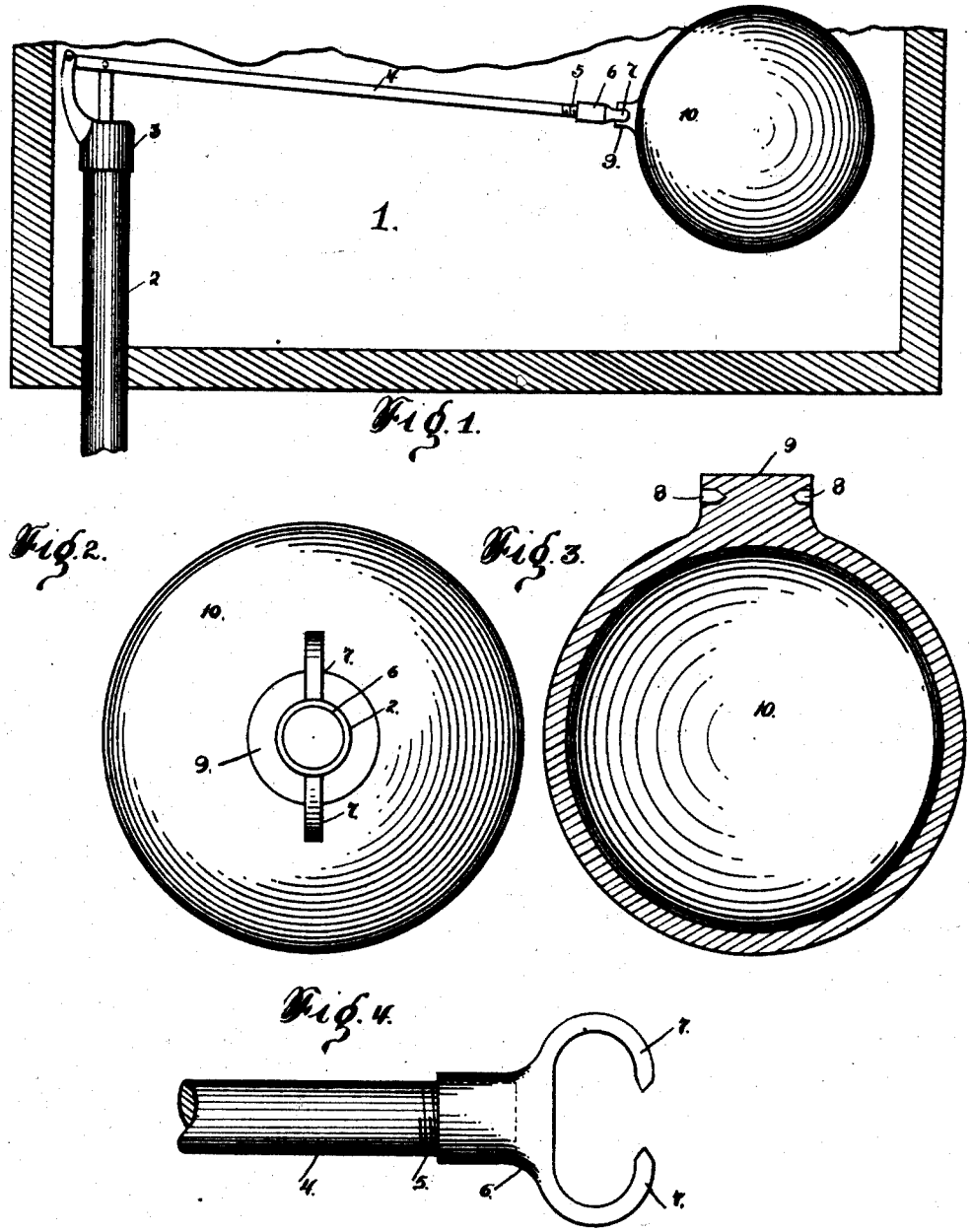

HUGH C. JOHNSTON, OF ROCHESTER, PENNSYLVANIA.

FLOAT FOR FLUSHING-TANKS.

No. 927,354.　　　　Specification of Letters Patent.　　　　Patented July 6, 1909.

Application filed December 26, 1908. Serial No. 469,256.

*To all whom it may concern:*

Be it known that I, HUGH C. JOHNSTON, a citizen of the United States of America, residing at Rochester, in the county of Beaver and State of Pennsylvania, have invented certain new and useful Improvements in Floats for Flushing-Tanks, of which the following is a specification, reference being had therein to the accompanying drawing.

This invention relates to floats for flushing tanks, and its object is to provide a float which will not corrode or become deteriorated by the action of the water within the tank.

Flushing tank floats have heretofore been constructed of copper or other metal which is susceptible to corrosion from impurities in the water in the tank. As the float is exposed constantly to the action of the water it is desirable that it be constructed of a material impervious to chemical action.

The present invention consists of a flushing tank float made entirely of earthen ware or a vitreous material thus rendering it indestructible by corrosion or chemical action.

The invention also consists of a float of spherical form, provided with an enlargement or boss for the attachment thereto of the float operating lever.

The construction of the improvement will be more specifically described hereinafter in connection with the accompanying drawing, and its novel features will be set forth and defined in the appended claim.

In the drawing, Figure 1 is a vertical section of a portion of a flushing tank equipped with my improved float, the inlet pipe, valve and float lever being shown in elevation. Fig. 2 is a plan of the float, Fig. 3 is a cross sectional view of the same, and Fig. 4 is a plan of the connection for the float.

The reference numeral 1 designates a flushing tank having a water inlet 2 provided with a valve 3. Said valve being operated by a lever 4 pivotally connected to the valve casing. The opposite end of the lever 4 is threaded, as at 5 to receive a C-shaped connection 6 made of malleable metal whereby the spring arms or prongs 7 thereof can be forced apart and sprung into oppositely disposed sockets 8 provided therefor in a circular enlargement or boss 9 formed upon a hollow spherical float 10. This float is made of earthenware similar to that used by potteries, and the exterior surface thereof is glazed or otherwise treated whereby the float will not be susceptible to the action of impurities in water. The boss or enlargement 9 is preferably formed integral with the float for the reason that I prefer to manufacture the same by pressure within a mold, rather than by blowing, as might be resorted to if the float was made of vitreous material.

It is obvious that my improvement provides an absolutely non-corrosive float, and therefore one which will be durable and effective in use.

Having now described my invention, what I claim as new, is:—

A one piece hollow spherical float formed exteriorly on one side with an integral boss provided in opposite sides thereof with sockets, a valve operating lever, and a connecting member for attaching the float to said lever, said connecting member having a socket at one end to receive said lever, the other end of said member being substantially C-shaped to form spring arms for engagement in the sockets of said boss.

In testimony whereof I affix my signature in the presence of two witnesses.

HUGH C. JOHNSTON.

Witnesses:
　C. A. BEISEL,
　C. E. COLEMAN.